(12) United States Patent
Uraizee et al.

(10) Patent No.: US 11,329,935 B2
(45) Date of Patent: May 10, 2022

(54) SMART ATTACHMENT OF CLOUD-BASED FILES TO COMMUNICATIONS

(71) Applicant: MICROSOFT TECHNOLOGY LICENSING, LLC, Redmond, WA (US)

(72) Inventors: Misbah Uraizee, Bellevue, WA (US); George Arthur Herbert, III, Kirkland, WA (US); Steven Lepofsky, Redmond, WA (US); Aaron Stolarz, Redmond, WA (US); Rebecca Lawler, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 821 days.

(21) Appl. No.: 14/846,293

(22) Filed: Sep. 4, 2015

(65) Prior Publication Data

US 2016/0315888 A1 Oct. 27, 2016

Related U.S. Application Data

(60) Provisional application No. 62/151,874, filed on Apr. 23, 2015.

(51) Int. Cl.
| | | |
|---|---|---|
| *H04L 12/58* | (2006.01) | |
| *H04L 29/08* | (2006.01) | |
| *H04L 51/08* | (2022.01) | |
| *G06Q 10/10* | (2012.01) | |
| *H04L 67/06* | (2022.01) | |
| *H04L 67/1097* | (2022.01) | |

(52) U.S. Cl.
CPC ............ *H04L 51/08* (2013.01); *G06Q 10/10* (2013.01); *G06Q 10/107* (2013.01); *H04L 67/06* (2013.01); *H04L 67/1097* (2013.01)

(58) Field of Classification Search
CPC ......... H04L 51/08; H04L 51/00; H04L 67/06; H04L 67/1097; G06F 17/301; G06Q 10/10; G06Q 10/107
USPC ........................................................ 709/206
See application file for complete search history.

(56) References Cited

U.S. PATENT DOCUMENTS 6,163,776 A * 12/2000 Periwal ............. G06F 17/30607
6,360,252 B1   3/2002 Rudy et al.
(Continued)

FOREIGN PATENT DOCUMENTS

CN       102411741 A    4/2012

OTHER PUBLICATIONS

Vadim Rutkevich, Smart Attachments: Efficient Attachment Manager for JIRA , Feb. 10, 2015 (Year: 2015).*

(Continued)

*Primary Examiner* — Schquita D Goodwin
(74) *Attorney, Agent, or Firm* — Michael Best & Friedrich LLP

(57) ABSTRACT

Technologies are presented directed to smart attachment of cloud-based files to communications such as email. A communication service may determine and select automatically between local and cloud versions of synchronized files allowing the recipient of the message to receive a version of the file regardless of whether the sender is offline or online when the attachment was made and in a user-friendly manner to the sender through a single representation.

12 Claims, 7 Drawing Sheets

(56) References Cited

U.S. PATENT DOCUMENTS

| | | | |
|---|---|---|---|
| 6,687,741 B1* | 2/2004 | Ramaley | G06Q 10/107 |
| | | | 709/206 |
| 7,536,440 B2 | 5/2009 | Budd et al. | |
| 7,640,363 B2 | 12/2009 | Teodosiu et al. | |
| 7,720,920 B2* | 5/2010 | Singh | G06F 17/30174 |
| | | | 707/695 |
| 8,635,295 B2 | 1/2014 | Mulder | |
| 9,832,149 B2* | 11/2017 | Uraizee | G06F 16/168 |
| 10,162,807 B2* | 12/2018 | Carlen | G06F 40/169 |
| 10,313,284 B1* | 6/2019 | Oostergo | G06F 3/0482 |
| 2002/0059384 A1 | 5/2002 | Kaars | |
| 2004/0186851 A1* | 9/2004 | Jhingan | H04L 51/00 |
| 2004/0186894 A1 | 9/2004 | Jhingan et al. | |
| 2005/0076086 A1 | 4/2005 | Budd et al. | |
| 2006/0265458 A1 | 11/2006 | Aldrich et al. | |
| 2007/0083486 A1* | 4/2007 | Bloch | G06F 17/30902 |
| 2008/0028050 A1* | 1/2008 | Fiducci | H04L 63/083 |
| | | | 709/220 |
| 2009/0282463 A1 | 11/2009 | McIsaac et al. | |
| 2009/0287777 A1 | 11/2009 | Bhogal et al. | |
| 2010/0082713 A1* | 4/2010 | Frid-Nielsen | G06F 17/301 |
| | | | 707/821 |
| 2011/0066685 A1 | 3/2011 | Kitada et al. | |
| 2011/0196933 A1* | 8/2011 | Jackson | G06Q 10/107 |
| | | | 709/206 |
| 2012/0166516 A1* | 6/2012 | Simmons | G06F 17/30233 |
| | | | 709/202 |
| 2012/0254327 A1* | 10/2012 | Tiger | H04W 4/18 |
| | | | 709/206 |
| 2012/0265817 A1 | 10/2012 | Vidalenc et al. | |
| 2012/0278407 A1* | 11/2012 | Meisels | H04L 51/08 |
| | | | 709/206 |
| 2012/0296981 A1* | 11/2012 | Uomini | H04L 51/22 |
| | | | 709/206 |
| 2012/0324113 A1* | 12/2012 | Prince | H04L 67/2814 |
| | | | 709/226 |
| 2013/0036135 A1* | 2/2013 | Brockey | G06F 17/3028 |
| | | | 707/770 |
| 2013/0086001 A1* | 4/2013 | Bhogal | G06F 17/30176 |
| | | | 707/689 |
| 2013/0275509 A1* | 10/2013 | Micucci | H04L 67/02 |
| | | | 709/204 |
| 2014/0019558 A1* | 1/2014 | Pollack | H04L 51/08 |
| | | | 709/206 |
| 2014/0172997 A1* | 6/2014 | Chan | H04L 51/22 |
| | | | 709/206 |
| 2014/0237380 A1* | 8/2014 | Kurrus | H04L 65/403 |
| | | | 715/752 |
| 2014/0359085 A1* | 12/2014 | Chen | G06F 9/468 |
| | | | 709/220 |
| 2014/0359465 A1* | 12/2014 | Litan Sever | G06F 3/04817 |
| | | | 715/738 |
| 2015/0169599 A1* | 6/2015 | Burnett | H04L 51/08 |
| | | | 707/662 |
| 2015/0200885 A1* | 7/2015 | Sharp | H04L 51/08 |
| | | | 709/206 |
| 2015/0339285 A1* | 11/2015 | Safaei | G06F 17/248 |
| | | | 715/256 |
| 2015/0350134 A1* | 12/2015 | Yang | H04L 67/1095 |
| | | | 709/206 |
| 2016/0071034 A1* | 3/2016 | Kushida | G06Q 10/0633 |
| | | | 705/7.27 |
| 2016/0142350 A1* | 5/2016 | Mutha | H04L 51/08 |
| | | | 709/206 |
| 2016/0241499 A1* | 8/2016 | Hailpern | G06Q 10/107 |
| 2018/0157764 A1* | 6/2018 | Longo | H04L 51/063 |

OTHER PUBLICATIONS

"International Search Report and Written Opinion Issued in PCT Application No. PCT/US2016/027465", dated Jun. 16, 2016, 10 Pages.

Messieh, Nancy, "How To Attach Files From The Cloud To Gmail In Chrome", Published on: Feb. 19, 2013, Available at: http://www.makeuseof.com/tag/how-to-attach-files-from-the-cloud-to-gmail-directly/.

"Introducing a New Way to Share Files with Outlook Web App", Published on: Oct. 8, 2014, Available at: http://blogs.office.com/2014/10/08/introducing-new-way-share-files-outlook-web-app/.

"What is OneDrive for Business?", Retrieved Date: Apr. 16, 2015, Available at: https://support.office.com/en-ie/article/What-is-OneDrive-for-Business-187f90af-056f-47c0-9656-cc0ddca7fdc2.

"All your Files, Ready Where You Are", Retrieved Date: Apr. 16, 2015, Available at: https://www.google.com/drive/.

"Office Action Issued in European Patent Application No. 16719626.0", dated Dec. 9, 2019, 6 Pages.

"First Office Action and Search Report Issued in Chinese Patent Application No. 201680023503.8", dated Mar. 4, 2020, 13 Pages.

"Second Office Action Issued in Chinese Patent Application No. 201680023503.8", dated Sep. 29, 2020, 18 Pages.

"Summons to Attend Oral Proceedings Issued in European Patent Application No. 16719626.0", Mailed Date: Jun. 23, 2021, 10 Pages.

"Office Action Issued in Chinese Patent Application No. 201680023503.8", dated Mar. 2, 2021, 7 Pages.

* cited by examiner

SMART ATTACHMENT OF CLOUD-BASED FILES TO COMMUNICATIONS

CROSS-REFERENCE TO RELATED APPLICATIONS

This application claims the benefit under 35 U.S.C. § 119(e) of U.S. Provisional Patent Application Ser. No. 62/151,874 filed on Apr. 23, 2015. The disclosure of the U.S. Provisional patent application is hereby incorporated by reference in its entirety.

BACKGROUND

Some communication applications such as email applications may provide rich attachment capabilities, where physical or cloud-based attachments can be sent/displayed along with metadata that may be live. Currently, if a cloud-based file is attached, the file is physically downloaded and attached to the message. With cloud storage services, users typically have a local version and a cloud version of the files. The two versions may not always be synchronized, especially if the user is offline with cloud storage service. Thus, if a user is attempting to send a cloud-based attachment while offline from the cloud service, they may get an error message.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to smart attachment of cloud-based files to exchanged communications. Inclusion of a locally stored attachment in an outgoing communication may be detected and a determination made whether a cloud version of the attachment is available. If the cloud version is available, the locally stored version or the cloud version of the attachment may be selected to be transmitted to a recipient. The selected version of the attachment may then be transmitted to the recipient along with the outgoing communication.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
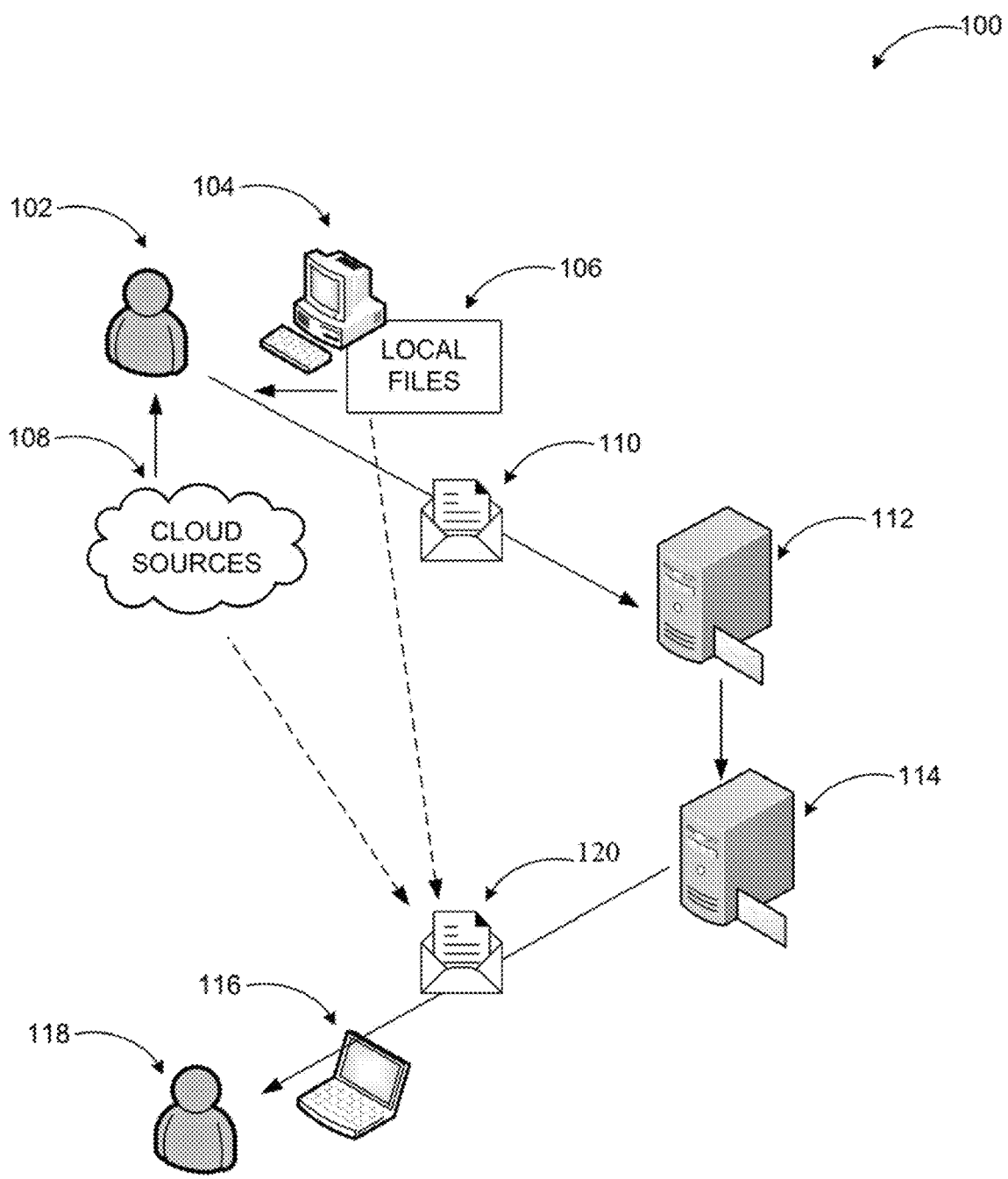
FIG. 1 illustrates an example flow of an email with an attachment, where an automatic selection between a local version and a cloud version of the attachment may be made.

As briefly described above, smart attachment of cloud-based files to communications such as email. A communication service may determine and select automatically between local and cloud versions of synchronized files allowing the recipient of the message to receive a version of the file regardless of whether the sender is offline or online when the attachment was made and in a user-friendly manner to the sender through a single representation.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing communication services including emails and exchange of attachments. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

While example implementations are described using emails herein, embodiments are not limited to emails. Smart attachment of cloud-based files to communications may be implemented in other communication types such as instant messages, data sharing, application sharing, online conferencing, and similar communications, where files or objects may be exchanged as attachment with the communication.

An attachment as used herein refers to any file or object that is included with a communication such as an email, where the file or object may be attached as a separate entity to the communication, inserted into a body of the communication as a file or object, or provided along with the communication as a link to the file or object. The attachment may include features such as interactivity, preview, presence, dynamic content update, and other non-static capabilities.

The technical advantages of providing smart attachment of cloud-based files to communications may include increased efficiency in network usage (reduced communication traffic), reduced data storage demand (avoidance of local file storage), improved user efficiency (enabling real time collaboration such as editing and commenting, as well as, availability of latest versions of attachments through the cloud version), and improved user interaction with user interfaces.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with attachments.

FIG. 1 illustrates an example flow of an email with an attachment, where an automatic selection between a local version and a cloud version of the attachment may be made.

As shown in diagram 100, a sender 102 may send an email or similar communication to a recipient 118. The exchange of the communication may be facilitated by one or more communication services. For example, a first communication service executed on one or more servers such as server 112 may process the communication and forward to a second communication service executed on one or more servers such as server 114. The sender 102 and the recipient 118 may access their respective communication services via client applications executed on their respective computing devices 104 and 116. The computing devices may be any computing device as described above. The client applications may be thin client applications (browser based) or thick client applications (locally installed).

In some example scenarios, the sender 102 may include an attachment (such as a file, an object, live metadata, etc.) in the communication 110. The attachment may be from local files 106 or from cloud sources 108. In some cases, the sender 102 may have files or other attachments that have a local version and a cloud version. Thus, the sender 102 may select to attach the local version or the cloud version. In collaborative situations or in cases where attachments include dynamic content, the cloud version may be more readily updated than a local version. From a communication service perspective, the cloud version may be preferred over the local version because of access, network usage, and capacity considerations.

In a system according to embodiments, the sender 102 may attach or attempt to attach a local version of a synchronized file (one with local and cloud versions), for example. The system may prompt the sender to select between the two versions, suggest the cloud version instead of the local version, or automatically switch to the cloud version instead of the local version. In some examples, the recipient 118 may automatically receive the cloud version upon the system determining that the local file has a cloud counterpart. In other examples, if the sender 102 is connected to the cloud service (cloud sources 108), the recipient 118 may receive the cloud version. If the sender 102 is offline, the recipient 118 may receive the local version (from the sender's local files 106). On the recipient side, the service may check to see if the received attachment files 120 are already synchronized to the recipient's local drive. If the files are not locally synchronized and the recipient is offline with the cloud service, he/she may get an alert that neither the cloud, nor the local version of the attachments are available.

Figure 2A:
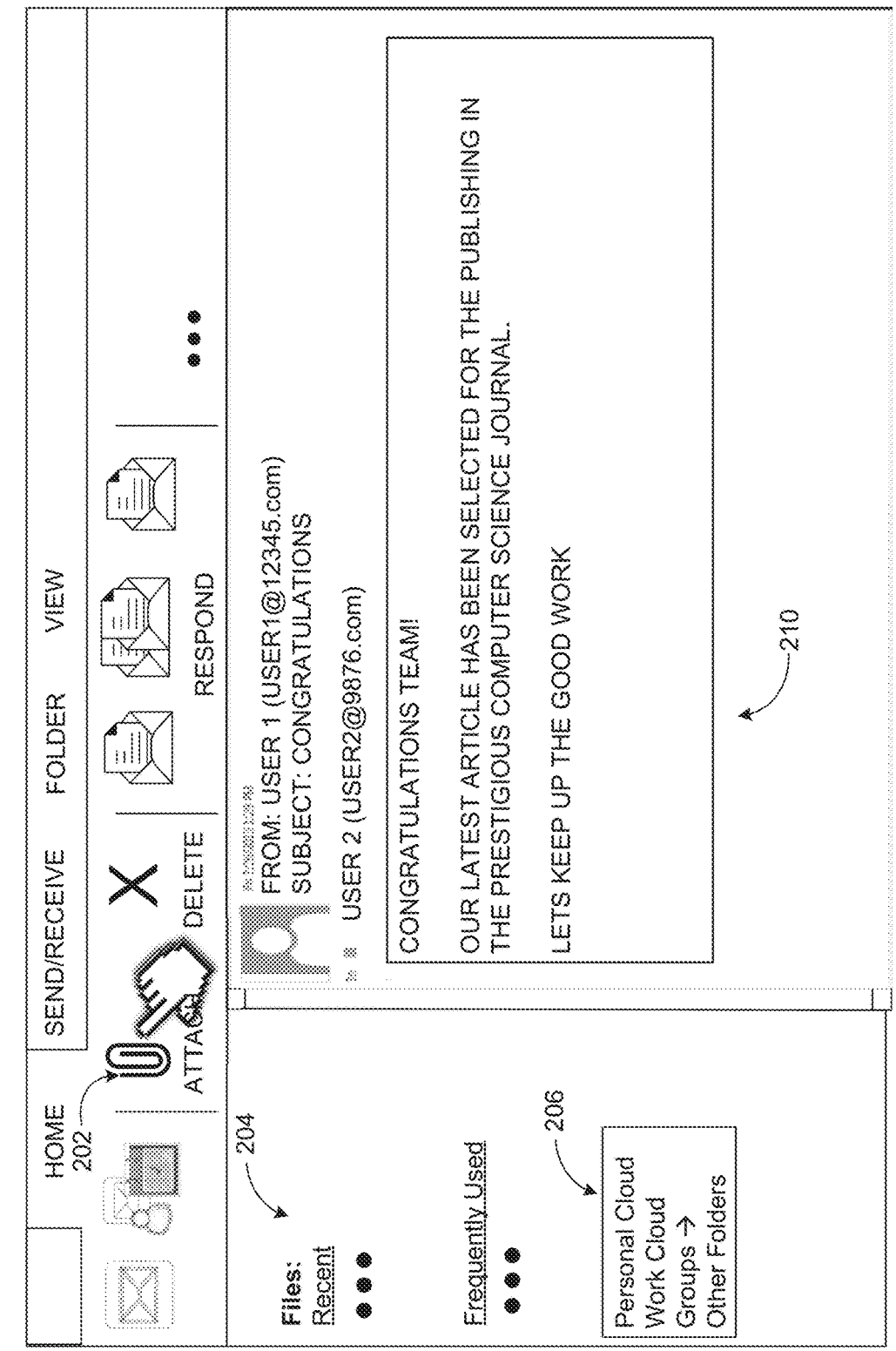
FIGS. 2A and 2B illustrate example user interfaces showing provision of an option to a sender to select a cloud version or a local version of an attachment.
Figure 2B:
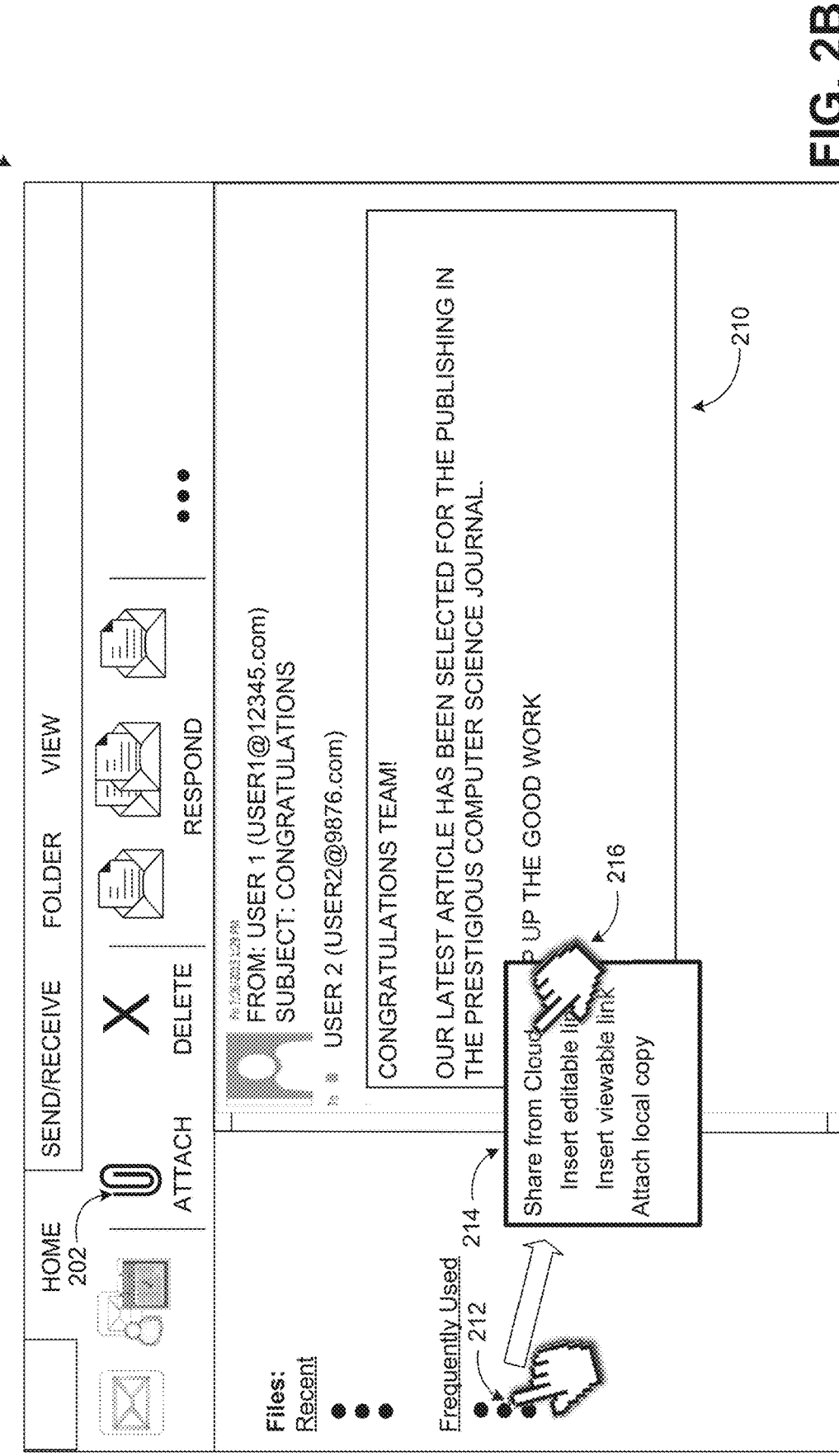

FIGS. 2A and 2B illustrate example user interfaces showing provision of an option to a sender to select a cloud version or a local version of an attachment.

In the example user interface 200A, an email with a body 210 is prepared to be sent. The sender may activate an attachment control 202 prompting a selection menu 204 to be presented. The selection menu may allow the sender select among available files. The presented files may be ordered based on recency, frequent use, or other criteria. In some embodiments, another selection menu 206 may be displayed enabling the sender to select among various cloud files, group folders, and other folders. One or more of the selections may be suggested (for example, by highlighting the selection).

An email service according to embodiments may also determine which version of the attachment to use based on where the user experience is launched from. For example, if the sender launches the communication application through a web browser, the cloud version may be automatically selected. On the other hand, if the sender launches the application from a local folder (e.g. selecting a file and requesting to send it via email), then the local version may be automatically selected. The attachment may be displayed in a single way on the user experience regardless of whether it is the cloud version or local version. In other examples, upon change of version after the file is attached may be indicated graphically (a folder icon changing to a cloud icon, etc.). Operations may be performed by an attachment module or a synchronization engine that may be part of the communication service/application or an independent module, or by the communication service/application itself.

In the example user interface 200B, the sender may have selected a file 212 from the frequently used files list. In response to the selection, a selection menu 214 may be presented providing the user with options to select a cloud version of the file or a local version. If the cloud version is selected (216), the sender may be presented with options to provide an editable version or just a viewable version of the file. In other embodiments, the service may automatically switch to the cloud version.

In some embodiments, the sender's system may transmit a hybrid of a physical attachment and a cloud version enabling the recipient's system to select which one to use based on a number of factors such as whether the recipient is offline, network capacity, storage capacity, recipient's device type (e.g., mobile vs. desktop computer), etc.

Figure 3:
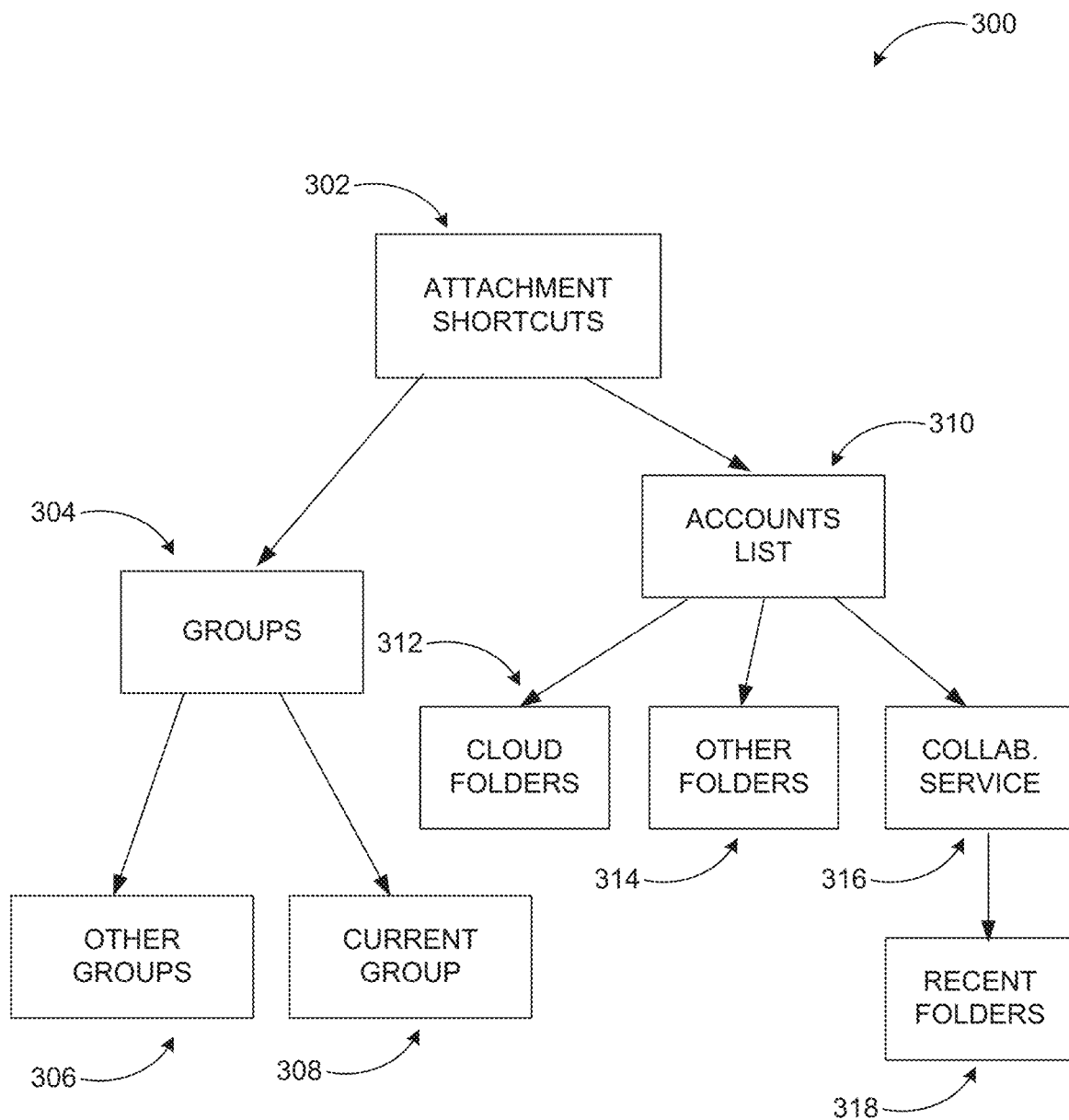
FIG. 3 illustrates an example of a data structure for providing smart attachment of cloud-based files to exchanged communications.

FIG. 3 illustrates an example of a data structure for providing smart attachment of cloud-based files to exchanged communications.

In an example implementation 300, a specified class (e.g., attachment shortcuts class 302) may define a top-level container. A groups class 304 may contain information about both a current group 308, and a list of other groups 306 (e.g., those selected by the user). An accounts list container 310 may hold information about networked accounts such as cloud folder 312, other web location folders 314, and collaboration service folders 316. The accounts may include information such as name and email address. Collaboration service folders 316 may include a list of its own recent folders 318.

The data structure may be initialized upon detecting an attempt to minimize CPU and memory usage on instantiation of an inspector, in some examples. Upon activation, the top-level class may query across its subclasses to determine what to populate the selection menu with. For example, it may ask the current group 308 whether that group should be displayed. The current group 308, upon construction, may determine whether the user is currently in a "We" space, and populate itself with details pertinent to the current group. This may be reported at activation time to determine what (if anything) to place in the top level of the selection menu. Other groups 306, web location folders (other folders 314), collaboration service folders 316, etc. may be populated upon activation. If the sender is offline, entry points for such networked locations may not be presented in the selection menu.

The examples provided in FIGS. 1 through 3 are illustrated with specific services, devices, applications, modules, module components, and configurations. Embodiments are not limited to environments according to these examples. Providing smart attachment of cloud-based files to communications may be implemented in environments employing fewer or additional services, devices, applications, modules, module components, and configurations. Furthermore, the example services, devices, applications, modules, module components, and configurations shown in FIG. 1 through 3 may be implemented in a similar manner with other values using the principles described herein.

Figure 4:
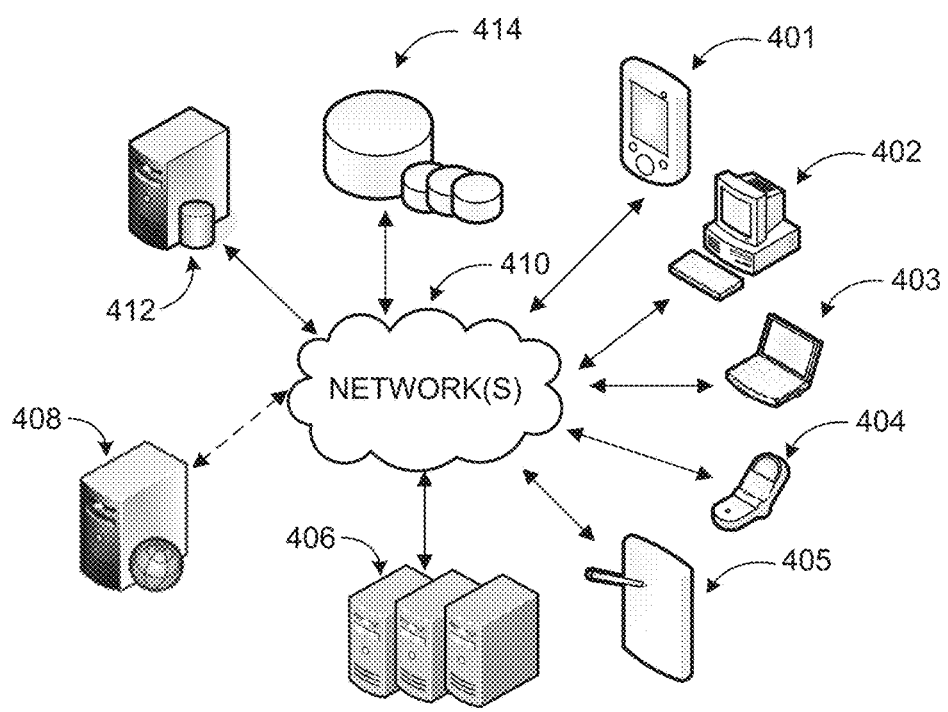
FIG. 4 is a networked environment, where a system according to embodiments may be implemented.

FIG. 4 is a networked environment, where a system according to embodiments may be implemented. As shown in a diagram 400, inclusion of a locally stored attachment in an outgoing communication may be detected and a determination made whether a cloud version of the attachment is available. If the cloud version is available, the locally stored version or the cloud version of the attachment may be selected to be transmitted to a recipient. The selected version of the attachment may then be transmitted to the recipient along with the outgoing communication. An example communication application or service may be implemented via software executed over one or more servers 406 or individual server 408. The communication application or service may communicate with client applications on individual computing devices such as a handheld computer 401, a desktop computer 402, a laptop computer 403, a smart phone 404, a tablet computer (or slate), 405 ('client devices') through network(s) 410 and control exchange of communications such as emails.

Client devices 401-405 are used to access the functionality provided by the communication service or application. One or more of the servers 406 or server 408 may be used to provide a variety of services associated with providing smart selection of attachment versions as discussed above. Relevant data may be stored in one or more data stores (e.g. data store 414), which may be managed by any one of the servers 406 or by database server 412.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to provide smart attachment of cloud-based files to exchanged communications. Furthermore, the networked environments discussed in FIG. 4 are for illustration purposes only. Embodiments are not limited to the example applications, modules, or processes.

Figure 5:
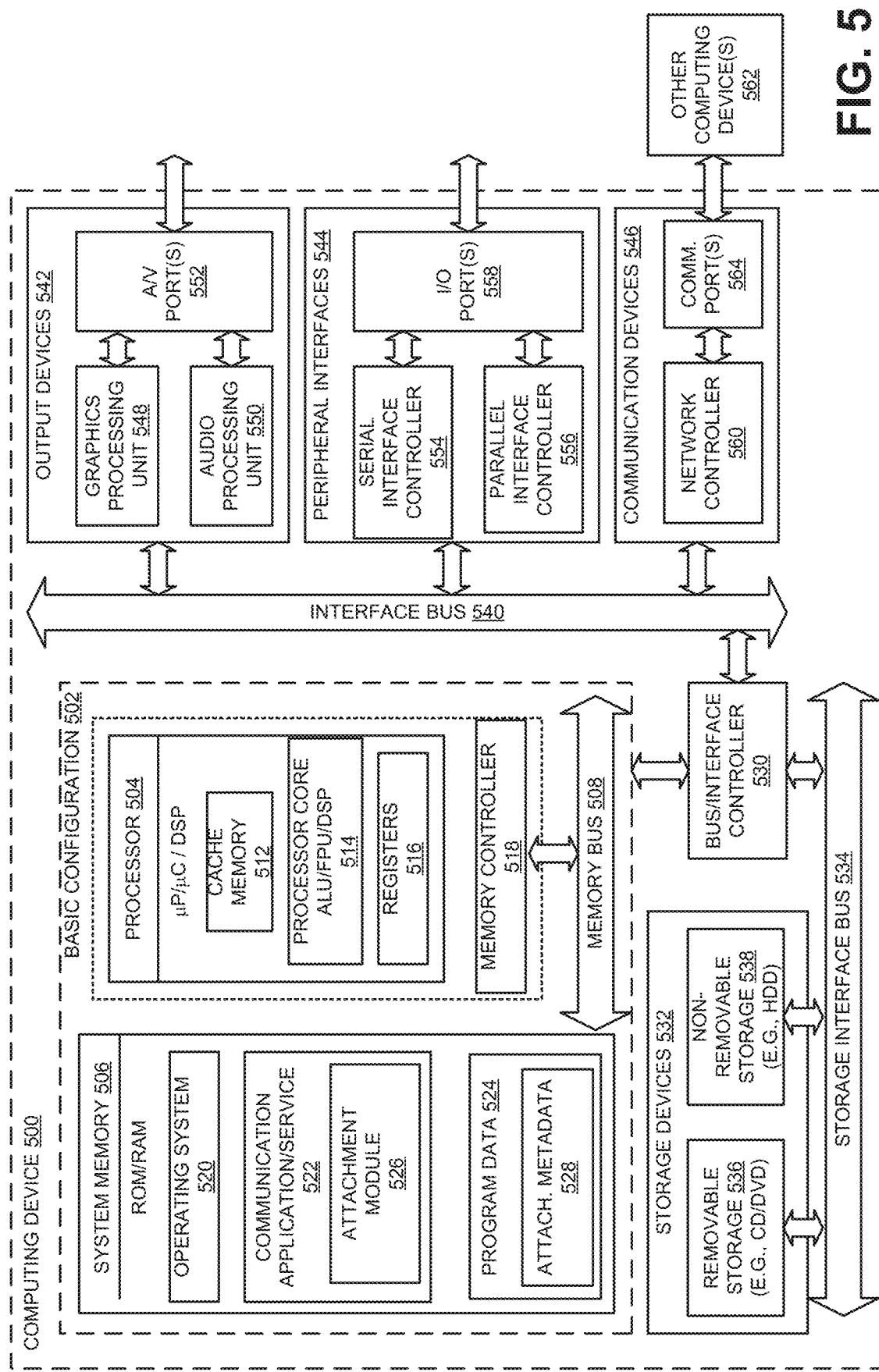
FIG. 5 is a block diagram of an example general purpose computing device, which may be used to provide smart attachment of cloud-based files to exchanged communications.

FIG. 5 and the associated discussion are intended to provide a brief, general description of a general purpose computing device, which may be used to provide smart attachment of cloud-based files to exchanged communications.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a communication application/service 522, an attachment module 526, and program data 524. The program data 524 may include, among other data, attachment metadata 528, as disclosed herein. The attachment module 526 may, in conjunction with the communication application/service 522, detecting attachment of a file to an outgoing communication, determining if a cloud version of the attached file is available, selecting one of the attached local version and the cloud version of the file to be transmitted to a recipient as attachment, and transmitting the selected version of the file as attachment to the recipient along with the outgoing communication.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, pen, keyboard, mouse, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to provide smart attachment of cloud-based files to exchanged communications. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
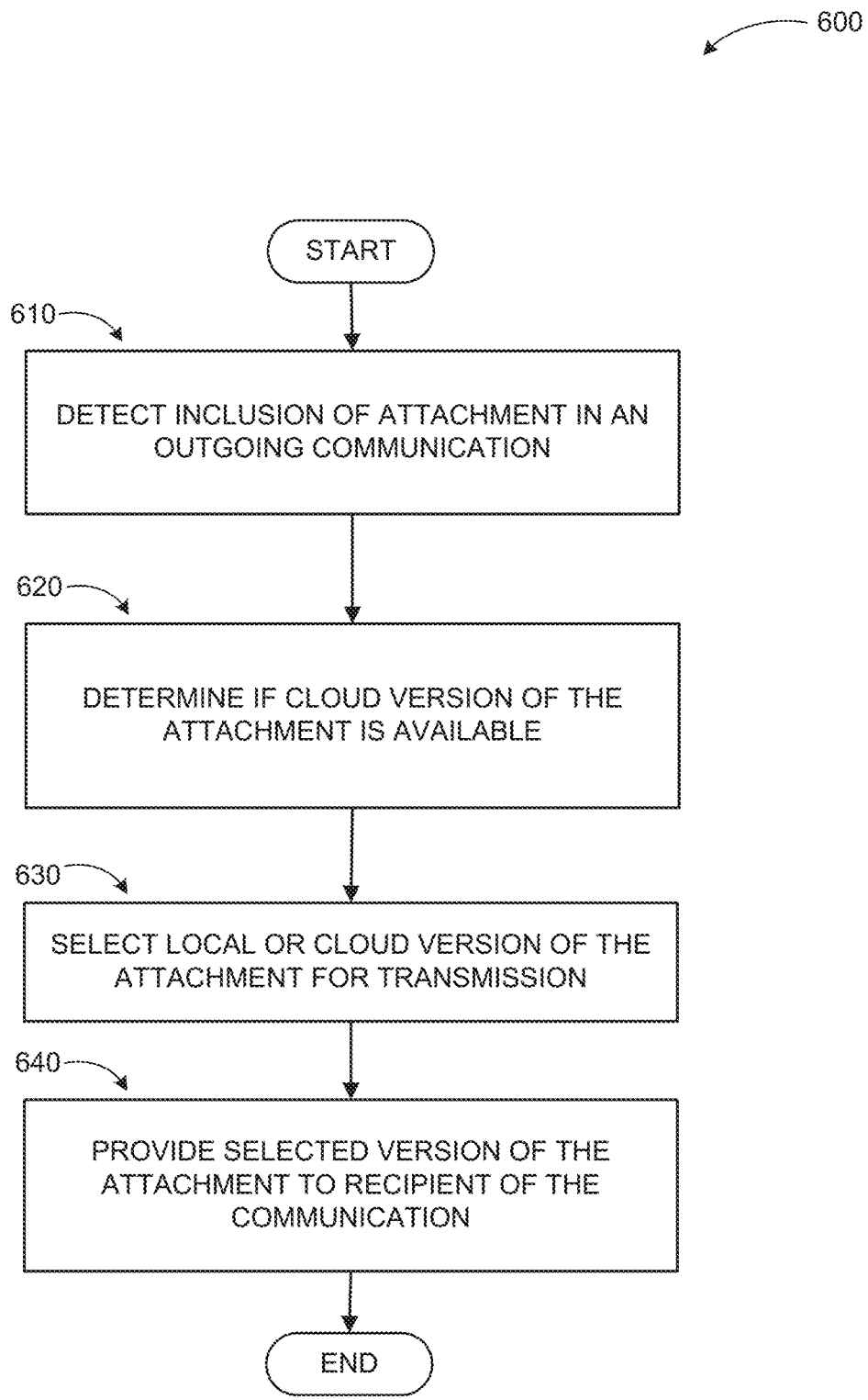
FIG. 6 illustrates a logic flow diagram of a method to provide smart attachment of cloud-based files to exchanged communications, according to embodiments.

FIG. 6 illustrates a logic flow diagram for process 600 of a method to provide smart attachment of cloud-based files to exchanged communications, according to embodiments. Process 600 may be implemented on a server or other system. An example system may include a communication service that manages various communication modes such as emails. The system may be capable of providing smart attachment of cloud-based files to exchanged communications as described herein.

Process 600 begins with operation 610, where inclusion of an attachment in an outgoing communication may be detected. The detection may be based on a sender activating an attachment control, moving a local file to the communication, or comparable actions. At operation 620, the communication service or application may determine if a cloud version of the included attachment is available. If the cloud version is available, one of the cloud version or the local version may be selected automatically at operation 630. For example, the sender may be offline with the cloud service storing the cloud version. In that scenario, the local version may be attached. In other examples, how the user initiated the communication (from a local application or a web-based application) may be taken into consideration, along with other factors such as versions of the attachment, content of the attachment (whether it includes dynamic data), etc.

At operation 640, the selected version of the attachment may be provided to a recipient of the outgoing communication along with the communication. In some embodiments, the sender may be suggested which version to select. In other embodiments, the service/application may automatically switch to the cloud version from the local version, despite the sender initially attempting to include the local version of the attachment.

The operations included in process 600 are for illustration purposes. Smart attachment of cloud-based files to exchanged communications may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing smart attachment of cloud-based files to exchanged communications is described. The means may include a means for detecting inclusion of a locally stored attachment in an outgoing communication; a means for determining if a cloud version of the attachment may be available; a means for automatically selecting one of the locally stored version and the cloud version of the attachment to be transmitted to a recipient; and a means for transmitting the selected version of the attachment to the recipient along with the outgoing communication.

According to some examples, a computing device to provide smart attachment of cloud-based files to exchanged communications may be described. The computing device may include a memory configured to store instructions and one or more processors coupled to the memory, the one or more processors configured to execute, in conjunction with the instructions stored in the memory, a communication service. The communication service may include a communication exchange module configured to facilitate exchange of communications arriving between senders and recipients and an attachment module. The attachment module may be configured to detect inclusion of a locally stored attachment in an outgoing communication; determine if a cloud version of the attachment may be available; automatically select one of the locally stored version and the cloud version of the attachment to be transmitted to a recipient; and transmit the selected version of the attachment to the recipient along with the outgoing communication.

According to other examples, the attachment module may be configured to select the cloud version of the attachment if a sender of the outgoing communication is connected to a cloud storage associated with the cloud version of the attachment. The attachment module may be configured to select the locally stored version of the attachment if the sender of the outgoing communication may be not connected to a cloud storage associated with the cloud version of the attachment. The attachment module may be further configured to determine if the attachment is synchronized to a file in a local storage of the recipient; and determine if the recipient may be connected to a cloud storage associated with the cloud version of the attachment.

According to further examples, the attachment module may be further configured to if the attachment is not synchronized to the file in the local storage of the recipient and the recipient is not connected to the cloud storage associated with the cloud version of the attachment, alert the recipient. The attachment module may be configured to select one of the locally stored version and the cloud version of the attachment based on one or more of whether the cloud version of the attachment is newer than the locally stored version and a size of the attachment. The attachment module may be configured to select one of the locally stored version and the cloud version of the attachment based on whether the attachment includes dynamic content.

According to yet other examples, the attachment may be one of a file and an object. The attachment module may be configured to select the locally stored version of the attachment if a sender of the outgoing communication includes the attachment to the outgoing communication from a local folder. The attachment module may be configured to select the cloud version of the attachment if a sender of the outgoing communication accesses the communication service through a web application. The outgoing communication may be one of an email, an instant message, an online conference recording, a data sharing session, and an application sharing session.

According to other examples, a method executed on a computing device to provide smart attachment of cloud-based files to exchanged communications is described. The method may include detecting inclusion of a locally stored attachment in an outgoing communication; determining if a cloud version of the attachment may be available; automatically selecting one of the locally stored version and the cloud version of the attachment to be transmitted to a recipient; and transmitting the selected version of the attachment to the recipient along with the outgoing communication.

According to further examples, the method may also include selecting the cloud version of the attachment if a sender of the outgoing communication is connected to a cloud storage associated with the cloud version of the attachment; and selecting the locally stored version of the attachment if the sender of the outgoing communication is not connected to a cloud storage associated with the cloud version of the attachment. The method may further include displaying the locally stored version and the cloud version of the attachment in a same manner.

According to some examples, the method may further include indicating a change from the locally stored version of the attachment to the cloud version of the attachment employing a graphical scheme. Detecting inclusion of the a locally stored attachment, determining if the cloud version of the attachment is available, and automatically selecting one of the locally stored version and the cloud version of the attachment may be performed at one or more of a module of communication service server, a module of a client device communicatively coupled to the communication service server, and a communication application executed on the client device communicatively coupled to the communication service server. The method may also include maintaining information associated with selection of attachments in a data structure that includes a top-level class and two subclasses, wherein the subclasses include a groups class including information about a current group and a list of user selected groups and an accounts list class including further subclasses associated with cloud folders, web-location folders, and collaboration service folders. The method may also include upon activation of an attachment control, querying the subclasses; and populating a selection menu based on results of the querying of the subclasses.

According to further examples, a computer readable memory device with instructions stored thereon to provide smart attachment of cloud-based files to exchanged emails is described. The instructions may include detecting inclusion of a locally stored attachment in an outgoing email; determining if a cloud version of the attachment may be available; selecting the cloud version of the attachment if a sender of the outgoing email is connected to a cloud storage associated with the cloud version of the attachment; selecting the locally stored version of the attachment if the sender of the outgoing email is not connected to a cloud storage associated with the cloud version of the attachment; and transmitting the selected version of the attachment to the recipient along with the outgoing email.

According to other examples, a selection menu may be presented to the sender of the email suggesting the cloud version of the attachment when the locally stored version of the attachment is selected.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide smart attachment of cloud-based files to exchanged communications, the method comprising:
   in response to detecting inclusion of a locally stored attachment in an outgoing communication, automatically selecting one of the locally stored attachment and a cloud version of the locally stored attachment as a selected version of an attachment based at least in part on whether the locally stored attachment includes dynamic content; and
   transmitting the selected version of the attachment along with the outgoing communication.

2. The method of claim 1 further comprising:
   displaying the locally stored attachment and the cloud version of the locally stored attachment in a same manner.

3. The method of claim 2, further comprising:
   indicating a change from the locally stored attachment to the cloud version of the locally stored attachment employing a graphical scheme.

4. The method of claim 1, wherein automatically selecting one of the locally stored attachment and the cloud version of the locally stored attachment is performed at one selected from a group consisting of a communication service server, a client device communicatively coupled to the communication service server, and a communication application executed on the client device communicatively coupled to the communication service server.

5. The method of claim 1, further comprising:
   maintaining information associated with selection of attachments in a data structure that includes a top-level class and two subclasses, wherein the subclasses include a groups class including information about a current group and a list of user selected groups and an accounts list class including further subclasses associated with cloud folders, web-location folders, and collaboration service folders.

6. The method of claim 5, further comprising:
   upon activation of an attachment control, querying the subclasses; and
   populating a selection menu based on results of the querying of the subclasses.

7. A method to provide smart attachment of cloud-based files to exchanged emails comprising:
   in response to detecting inclusion of a locally stored attachment in an outgoing email, automatically selecting one of the locally stored attachment and a cloud version of the locally stored attachment as a selected version of an attachment based at least in part on whether the locally stored attachment includes dynamic content; and
   transmitting the selected version of the attachment to a recipient along with the outgoing email.

8. A computing device to provide smart attachment of cloud-based files to exchanged communications, the computing device comprising:
   a memory configured to store instructions; and
   one or more processors coupled to the memory, the one or more processors configured, via execution of the instructions stored in the memory, to
     in response to detecting inclusion of a locally stored attachment in an outgoing communication, automatically select one of the locally stored attachment and a cloud version of the locally stored attachment as a selected version of an attachment based at least in part on whether the locally stored attachment includes dynamic content and transmit the selected version of the attachment along with the outgoing communication.

9. The computing device of claim 8, wherein the one or more processors are configured to:
   determine if the locally stored attachment is synchronized to a file in a local storage of a recipient of the outgoing communication; and
   determine if the recipient is connected to the cloud storage associated with the cloud version of the locally stored attachment.

10. The computing device of claim 9, wherein the one or more processors are further configured to:
    in response to determining the locally stored attachment is not synchronized to the file in the local storage of the recipient and the recipient is not connected to the cloud storage associated with the cloud version of the locally stored attachment, alert the recipient.

11. The computing device of claim 8, wherein the locally stored attachment is one of a file and an object.

12. The computing device of claim 8, wherein the outgoing communication is one of an email, an instant message, an online conference recording, a data sharing session, and an application sharing session.

\* \* \* \* \*